(12) United States Patent
Zöllner et al.

(10) Patent No.: US 8,287,789 B2
(45) Date of Patent: Oct. 16, 2012

(54) PROCESS FOR THE PRODUCTION OF A MOLDED ARTICLE

(75) Inventors: Olaf Zöllner, Leverkusen (DE); Thorsten Just, Randersacker (DE); Winfried Kohl, Isando (ZA)

(73) Assignee: Bayer MaterialScience AG, Leverkusen (DE)

(*) Notice: Subject to any disclaimer, the term of this patent is extended or adjusted under 35 U.S.C. 154(b) by 858 days.

(21) Appl. No.: 11/313,420

(22) Filed: Dec. 21, 2005

(65) Prior Publication Data

US 2006/0138699 A1 Jun. 29, 2006

(30) Foreign Application Priority Data

Dec. 24, 2004 (DE) .......................... 10 2004 062 477

(51) Int. Cl.
B29C 45/14 (2006.01)
(52) U.S. Cl. ...................... 264/255; 264/328.7; 264/267; 264/269; 425/127; 425/129.1
(58) Field of Classification Search .................... None
See application file for complete search history.

(56) References Cited

U.S. PATENT DOCUMENTS

| | | | | |
|---|---|---|---|---|
| 3,246,066 A | * | 4/1966 | Gits | 264/132 |
| 4,296,230 A | * | 10/1981 | Pedain et al. | 528/67 |
| 4,443,392 A | * | 4/1984 | Becker et al. | 264/485 |
| 4,629,477 A | * | 12/1986 | Geke | 95/152 |
| 5,269,986 A | * | 12/1993 | Eisen et al. | 264/46.4 |
| 5,338,592 A | * | 8/1994 | Ohsumi et al. | 428/106 |
| 5,525,179 A | * | 6/1996 | Stickling | 156/245 |
| 5,902,534 A | * | 5/1999 | Fujishiro et al. | 264/255 |
| 5,965,222 A | * | 10/1999 | Benzing et al. | 428/31 |
| 6,264,869 B1 | * | 7/2001 | Notarpietro et al. | 264/247 |
| 6,468,458 B1 | * | 10/2002 | Anderson et al. | 264/246 |
| 6,676,999 B2 | * | 1/2004 | Valet | 427/487 |
| 6,875,301 B2 | * | 4/2005 | Kauppi et al. | 156/245 |

(Continued)

FOREIGN PATENT DOCUMENTS

DE 24 61 925 11/1975

(Continued)

OTHER PUBLICATIONS

Patent Abstracts of Japan Bd. 2000, Nr. 23, Feb. 10, 2001—& JP 2001 170964 A (Ube Ind Ltd), Jun. 26, 2001.
Patent Abstracts of Japan Bd. 2003, Nr. 12, Dec. 5, 2003—& JP 2003 334838 A (Nippon Bee Chemical Co Ltd; Nissei Plastics Ind Co), Nov. 25, 2003.
Patent Abstracts of Japan Bd. 015, Nr. 160 (M-1105) Apr. 22, 1991—& JP 03 030922 A (Yamaha Corp), Feb. 8, 1991.

*Primary Examiner* — Edmund H. Lee
(74) *Attorney, Agent, or Firm* — Connolly Bove Lodge & Hutz LLP

(57) ABSTRACT

A process for the production of a molded article is disclosed. The process comprise a) placing a plastic film abutting the inside wall of a first half of a mold, said mold including a first and second halves, b) combining said second half with said first half in a manner creating a mold cavity, c) injecting resin into said cavity to produce an article to which surface adherently bonded is said plastic film, d) separating one of the halves from the other half, said article remaining with said other half, e) combining a supplemental half with said other half in a manner forming a gap between the inner wall of said supplemental half and the surface of said molded article, f) injecting lacquer into said gap, g) curing the lacquer to produce a lacquered molded article, and h) cooling and removing the lacquered molded article from the mold. The inventive process is particularly suitable for making vehicular mirrors.

4 Claims, 2 Drawing Sheets

U.S. PATENT DOCUMENTS

| | | | |
|---|---|---|---|
| 7,674,414 B2 * | 3/2010 | Neitzke | 264/241 |
| 7,981,342 B2 * | 7/2011 | Hayes et al. | 264/241 |
| 8,071,000 B2 * | 12/2011 | Neitzke | 264/241 |
| 8,083,979 B2 * | 12/2011 | Hayes et al. | 264/241 |
| 8,092,733 B2 * | 1/2012 | Hayes et al. | 264/241 |
| 2003/0197307 A1 * | 10/2003 | Kitamura et al. | 264/255 |
| 2006/0009545 A1 * | 1/2006 | Frahn et al. | 523/200 |
| 2006/0151911 A1 * | 7/2006 | Zollner et al. | 264/255 |
| 2008/0095992 A1 * | 4/2008 | Hirschfelder et al. | 428/200 |

FOREIGN PATENT DOCUMENTS

| | | | |
|---|---|---|---|
| DE | 10210269 | * | 9/2003 |
| EP | 607 968 | B1 | 1/2003 |
| JP | 2002-160256 | A | 6/2002 |

* cited by examiner

A

D'

B

E'

C'

F'

PROCESS FOR THE PRODUCTION OF A MOLDED ARTICLE

FIELD OF THE INVENTION

The invention relates to a process and in particular to thermoplastic injection molding.

BACKGROUND OF THE INVENTION

From the literature, composites of metal foils and polymers are known, wherein these layers are either bonded and/or joined together by temperature and pressure. It is a disadvantage of these composite systems that heat and pressure have to be produced in a separate step to join the layers. In addition, it is often necessary to rework the edges of the layers. Fastening elements and the like have to be attached subsequently in a separate step.

The object was therefore to provide a process with which it is possible to produce composite moldings consisting of several layers in a technically simple and cost-effective manner in such a way that the layers are joined together adhesively and optionally other elements, such as e.g. fastening elements, can be co-applied directly during production. It was possible to achieve this object by the process according to the invention.

SUMMARY OF THE INVENTION

A process for the production of a molded article is disclosed. The process comprise a) placing a plastic film abutting the inside wall of a first half of a mold, said mold including a first and second halves, b) combining said second half with said first half in a manner creating a mold cavity, c) injecting resin into said cavity to produce an article to which surface adherently bonded is said plastic film, d) separating one of said halves from the other half, said article remaining with said other half, e) combining a supplemental half with said other half in a manner forming a gap between the inner wall of said supplemental half and the surface of said molded article, f) injecting lacquer into said gap, g) curing the lacquer to produce a lacquered molded article, and h) cooling and removing the lacquered molded article from the mold. The inventive process is particularly suitable for making vehicular mirrors.

DETAILED DESCRIPTION OF THE INVENTION

Figure 1:
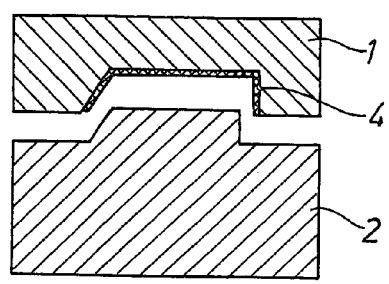
FIG. 1 is a schematic diagram of an embodiment of the inventive process. It shows under A) a mold with a first half (1) and a second half (2) whereas in the first half a plastic film (4) is placed. Under B) the mold is closed by combining the two halves and creating a cavity (5). C) and D) show the replacement of the first half (1) by the supplemental half (3) after having injected as resin (6) into the cavity. E) shows the lacquer (7) which is injected into the gap (cavity) created by the second half (2) and the supplemental half (3). Under F) the molded article (8) is removed from the opened mold.
Figure 1:
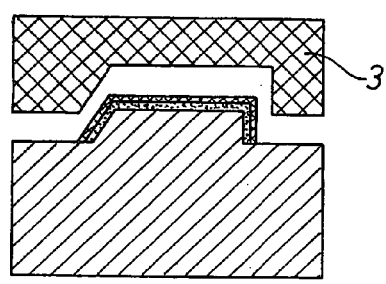
Figure 1:
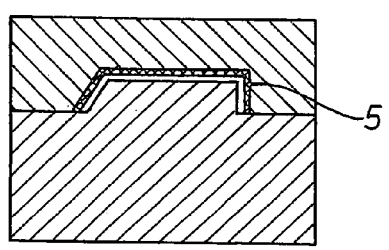
Figure 1:
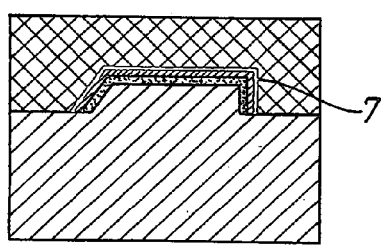
Figure 1:
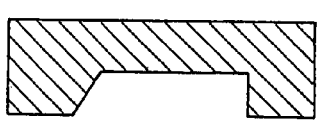
Figure 1:
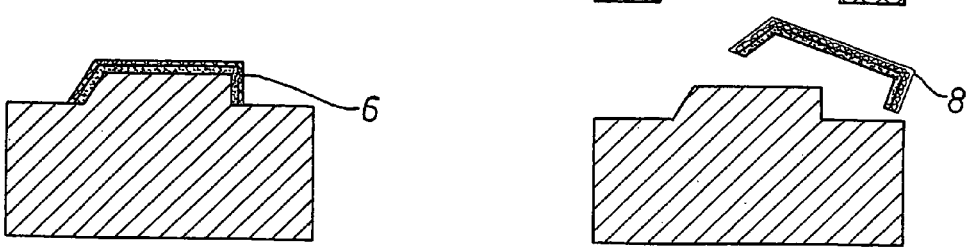
Figure 2:
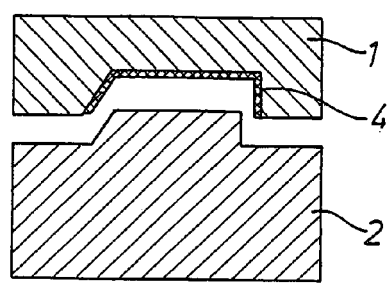
FIG. 2 is a schematic diagram of an embodiment of the inventive process. It shows under A) a mold with a first half (1) and a second half (2) whereas in the first half a plastic film (4) is placed. Under B) the mold is closed by combining the two halves and creating a cavity (5). C') and D') show the replacement of the second half (2) by the supplemental half (3) after having injected as resin (6) into the cavity. E') shows the lacquer (7) which is injected into the gap (cavity) created by the first half (1) and the supplemental half (3). Under F') the molded article (8) is removed from the opened mold.
Figure 2:
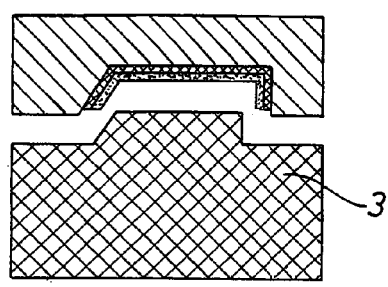
Figure 2:
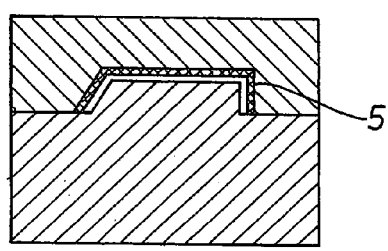
Figure 2:
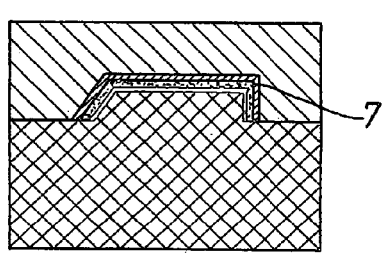
Figure 2:
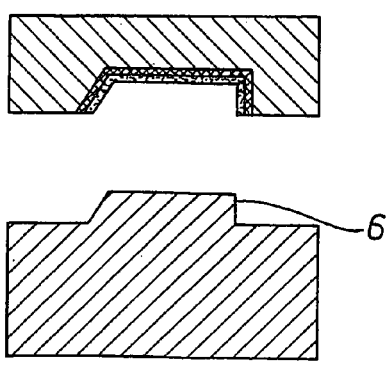
Figure 2:
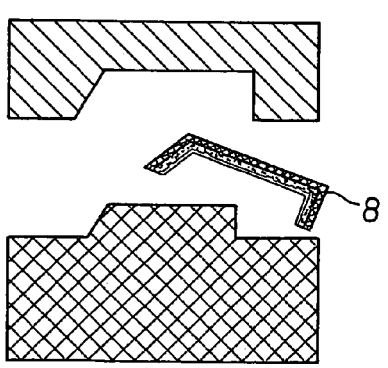

The invention provides a process for the production of a molded article comprising
a) placing a plastic film abutting the inside wall of a first half of a mold, said mold including a first and second halves,
b) combining said second half with said first half in a manner creating a mold cavity,
c) injecting resin into said cavity to produce an article to which surface adherently bonded is said plastic film,
d) separating one of said halves from the other half, said article remaining with said other half,
e) combining a supplemental half with said other half in a manner forming a gap between the inner wall of said supplemental half and the surface of said molded article,
f) injecting lacquer into said gap,
g) curing the lacquer to produce a lacquered molded article, and
h) cooling and removing the lacquered molded article from the mold.

Importantly, the term "half" as used herein is a term of art referring to a section of the mold and does not necessarily mean a quantitative half.

In carrying out the process the optionally coated film may be placed in a first mold half in step a) so that either the coating faces the mold wall or away therefrom.

The plastic film used is preferably 0.175 to 3.00 mm thick. The film may be coated by screen-printing, by vacuum metallizing or by other known coating techniques. Paints, metals or the like may be used as coating materials.

Instead of a single plastic film with coating, a film composite may also be used. The simplest embodiment is a three-layer construction of a plastic film, for example a metal layer, or coating, sandwiched between two plastic films. The advantage of a construction of this type lies in the fact that the coating is protected.

To prevent slippage of the film inserted into the first mold half the film may be fixed in place by vacuum, static charge or by mechanical anchoring. If the film is inserted into the first mold half so that the coating faces the mold cavity it will be covered by the injected plastic directly during injection molding. If, on the other hand, the film is inserted so that its coating faces the wall of the mold the plastic is injected directly on to the plastic film during injection molding.

The film used is preferably transparent. Polycarbonate (PC), polymethyl methacrylate (PMMA), styrene acrylonitrile (SAN) and cyclic olefin copolymers (COC), transparent polyamide and their blends are preferably used as material for the film.

PC, SAN, COC and PMMA are preferably used as the resins for injection molding. The plastics for injection are also preferably transparent.

The mold is preferably heated to 70 to 110° C. for the step of injection molding.

After injection, the mold is opened after cooling by separating the first and second halves. One of said mold halves containing the molded article is brought together with a different, supplemental mold half, in a manner forming a cavity (gap) between the inner wall of the supplemental mold half and the surface of the molded article. This cavity is a gap formed either due to that the supplemental mold half is slightly larger than the preceding separated mold half, which was removed, or by the molded article having shrunk during the cooling process in which case it is not necessary that the supplemental mold half be larger than the removed half.

The lacquer for the protection of the injection molded article is then introduced into the cavity (gap). The thickness of the gap corresponds to the thickness of the lacquer applied. Suitable lacquer systems that offer UV protection and/or scratch resistance include urethane acrylates, 2-component polyurethane lacquers or inorganic lacquers, preferably based on polysiloxanes.

The molded article according to the invention may be used in the automotive industry, particularly as internal and external mirrors for vehicles, and in other branches of industry as moldings.

The invention is explained in more detail by means of the following example.

EXAMPLE

Production of a molded article in the form of a mirror:

In a steel mold, a metallized polycarbonate film (Makrolon® DE 1.1 polycarbonate film, a product of Bayer MaterialScience AG; 0.175 mm thick) was inserted into a first mold half. This film was held in the mold by electrostatic charge. The mold temperature was approx. 70° C. After closing the mold using the second mold half, polycarbonate (Makrolon® AL 2647 polycarbonate composition, a product of Bayer MaterialScience AG) was injected into the mold. The temperature of the polycarbonate composition was 290° C. The injection time was approx. 5 seconds. After a cooling period of about 30 seconds, the mold was opened. The molded article remained in the second mold half. A supplemental mold half was then used to close the mold. A gap remained between the molded article and the supplemental mold half. The width of the gap was about 0.1 mm. A two-component polyurethane lacquer system was injected into the gap. The lacquer system was at 80° C. and the mold was at approx. 60° C. The injection time was approximately 2 seconds. It took about 80 seconds for the lacquer to cure. The mold was then opened and the finished lacquered molded article removed.

The solvent-free, aliphatic polyurethane lacquer system contained a mixture of a solvent-free polyester polyol (Desmophen® VPLS 22 49-1 from Bayer MaterialScience AG) and a solvent-free, aliphatic polyisocyanate (Desmodur® XP 2410 from Bayer MaterialScience AG) in a weight ratio of 1:1 (catalysed with approx. 1 wt. % DBTL (dibutyltin dilaurate)).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded article comprising
    a) placing a plastic film abutting the inside wall of a first half of a mold, said mold including a first and second halves, wherein the plastic film is formed outside of the mold,
    b) combining said second half with said first half in a manner creating a mold cavity,
    c) injecting resin into said cavity, wherein the injected resin forms said molded article and said plastic film is adherently bonded to a first surface of said molded article,
    d) separating one of the halves from the other half, said article remaining with said first half,
    e) combining a supplemental half with said first half in a manner forming a gap between the inner wall of said supplemental half and a second surface of said molded article opposite said first surface,
    f) injecting lacquer into said gap, wherein said lacquer is a 2-component polyurethane lacquer,
    g) curing the lacquer to produce a lacquered molded article, and
    h) cooling and removing the lacquered molded article from the mold.

2. The process according to claim 1, wherein one of the surfaces of the film is at least partially coated.

3. The process of claim 2 wherein said one surface of the film faces the mold wall.

4. The process of claim 2 wherein said one surface of the film faces away from the mold wall.

* * * * *